Dec. 22, 1936.   B. H. T. MULCH   2,065,390
DISPENSING DEVICE
Filed July 26, 1933
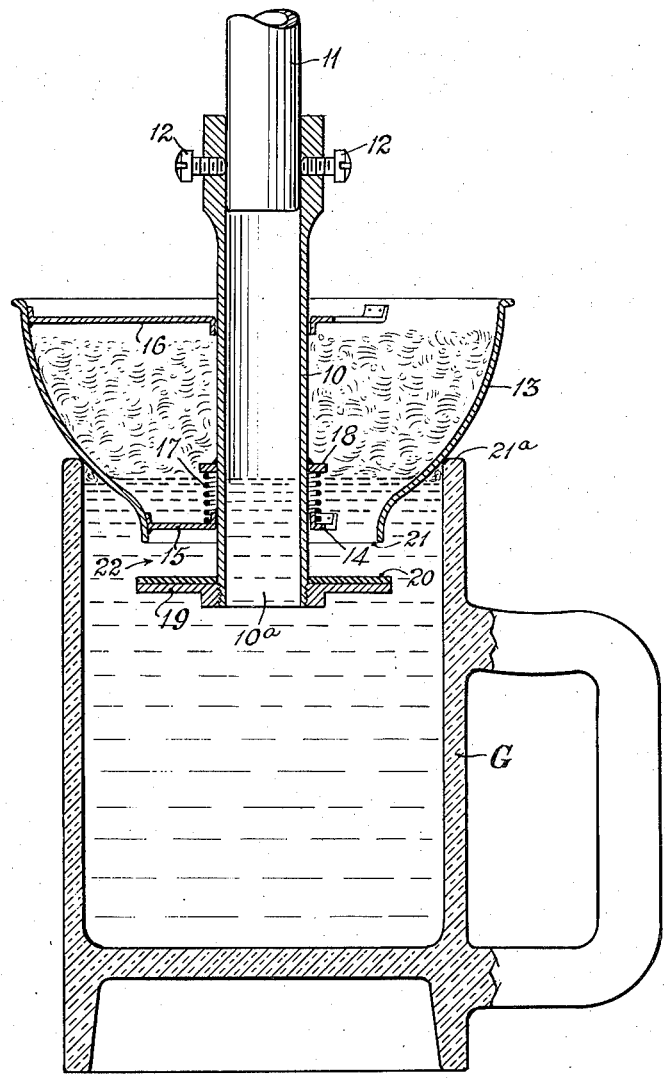
INVENTOR
B. H. T. MULCH
BY
*Joseph Hinchman*
ATTORNEY Patented Dec. 22, 1936

2,065,390

UNITED STATES PATENT OFFICE 2,065,390

DISPENSING DEVICE

Balthazar H. T. Mulch, Westwood, N. J.

Application July 26, 1933, Serial No. 682,176

17 Claims. (Cl. 225—8)

This invention relates to appliances for dispensing beer or other foaming liquids and has for one of its objects the provision of means for saving the foam which ordinarily flows over the top of a drinking vessel when the beer is drawn through a tap into the vessel from a beer barrel or other container.

According to present practice the excess foam is either spilled over the rim of the vessel and lost, or, after removal of the vessel from the tap, is skimmed off by hand into another vessel for pouring into the glass destined for the next customer. This procedure is not only troublesome but unsanitary and time-consuming.

It is accordingly a further object of the invention to provide means whereby the excess foam is collected automatically while the beer is being drawn, and is accumulated in a sanitary manner in the collecting appliance and thence delivered automatically into the next drinking vessel applied to the tap.

It is also an object of the invention to provide a device of the type indicated whereby a vessel may be quickly and conveniently filled with a foaming liquid to the top or as near to the top of the vessel as desired, the foam being automatically removed and collected, and if desired, introduced into the next vessel brought under the tap for filling.

A still further object of the invention is to provide a foam removing device which is simple and inexpensive in construction, can be easily kept clean and can be readily so constructed.

The above and other features of the invention are illustrated and described fully in the accompanying drawing and in the description following, and the features of novelty are pointed out in the appended claims.

The drawing shows by way of example, in vertical section, a dispensing appliance embodying the present invention, the same being shown in combination with a beer tap of conventional structure and with a beer glass in place to receive the beer, the device being shown in the operative or dispensing position.

In the preferred embodiment of the invention selected for illustration and description, the part designated by the reference character 10 is a hollow metal stem which is adapted to be attached removably to a tap 11 of conventional or suitable form by suitable means, such as screws 12. The numeral 13 indicates a skimmer or collecting member shown as taking the form of a cup of metal, porcelain or other suitable material, surrounding the stem 10, upon which the cup is mounted slidingly, having an aperture in a bottom ring 14 through which the stem extends, the ring being attached to the main body of the cup 13 by a spider 15. The upper portion of the cup is similarly guided on the stem by a ring and spider structure 16. A coil spring 17 is provided between the bottom ring 14 of the cup and a suitable abutment 18 fixed to or integral with the stem 10, the spring tending normally to bias the cup downwardly. A flange 19 at the lower end of the stem limits the downward play of the cup, and is preferably provided with a washer or gasket 20 of sheet rubber or other suitable material adapted to be engaged yieldingly with an annular ridge 21 at the under surface of the cup to seal the cup when the latter is in its lowermost position to prevent escape of fluid contained in the cup, as will be clear from the description hereinafter.

The upper and lower spiders 16 and 15 guide the cup in its upward and downward movement and prevent the cup from wobbling. A cover may be provided for the cup, to confine the foam and prevent access of foreign matter thereto, the cover being provided with a suitable vent for the escape of air as the cup is filled.

The parts above described are illustrated in their operative position, which is assumed when a beer-glass G, or like drinking vessel, is applied by the operator beneath the cup 13 and lifted to the position shown, placing the coil spring 16 under compression, after which the tap 11 is opened in usual fashion, as by a hand-operated valve (not shown) to cause the liquid to flow down the stem 10 into the glass G.

The beer thus drawn flows into the glass 19 through the mouth 10a of the hollow stem 10, and as the foam forms on the rising surface of the beer, it is confined within the glass by the engagement of the rim 21a of the glass with the curved outer surface of the cup, and is forced by the draft pressure from the barrel to pass upwardly into the cup through the annular opening 22 around the stem 10, filling the interior of the cup more or less according to the manner of drawing, which can be regulated by the operator to avoid any spillage of foam over the rim of the cup. It will be understood that the cup 13 is so shaped as to be capable of forming a liquid-proof seal with the top of the glass 19. As the level of the beer rises in the glass G, the rising foam collects in the cup 13. The flow of beer may thus be continued until the level of liquid beer has risen to any desired height in the glass.

When the glass has received its full measure of beer, the space above the level of fluid in the glass is filled with foam under a slight pressure so that when the glass is removed from the dispensing device, the foam expands and fills the top portion of the glass. As the glass is removed, the cup 13 descends by gravity, aided by the spring 16, until the ridge 21 is firmly engaged with the gasket 20, so that the foam is confined within the cup. Thus, neither foam nor liquid beer condensed therefrom is lost, the beer and foam remaining in the cup until another vessel is applied, whereupon the contents of the cup are automatically released and flow into such vessel before the tap is operated to draw from the main supply under pressure in the barrel.

It will be readily seen from the foregoing disclosure that I have provided an appliance for conserving the foam and resultant fluid from beer and like foaming liquids that is completely automatic, operating without special skill on the part of the operator, who is able to control the height of liquid beer in the glass without loss of foam, the withdrawal of the foam occurring automatically and requiring no manipulation by a hand of the operator, so that the operator has one hand free for manipulating the valve or tap. Thus, if desired, the cup 13 may be provided with means for leading the foam to another container, in which case the cup acts more as a foam-skimming device to prevent the foam from flowing over the sides of the glass. Also, the stem 10 may be made integral with the tap or valve structure, and where, as illustrated, it is made separate, particularly for application to existing dispensing devices, it may be provided with a tapered opening so as to fit faucets of different sizes.

It is to be understood further that the structural details shown are illustrative merely, and are susceptible of considerable modification, without departing from the spirit of the invention, within the scope of the appended claims.

I claim:

1. In an appliance of the class described, the combination with a discharge member, of a movable cup member surrounding said discharge member at its discharge end, means for guiding the cup member upon the discharge member, a flange upon the discharge member for limiting the downward movement of the cup member and adapted to cooperate with the latter to seal the same, the wall of said cup member including an inclined portion which is adapted to be engaged by a vessel to be filled in such manner that the cup member is raised relatively to the discharge member to provide a passage from the upper portion of the vessel into the interior of the cup member, and a spring urging said cup member into closed position as the said vessel is withdrawn.

2. The combination with a tap for dispensing a foaming liquid and having a passage through which the liquid flows, of apparatus for receiving and storing the foam rising during the filling of one vessel and discharging such foam and the liquid condensed therefrom into the next vessel to be filled, comprising a receptacle associated with the tap outside of the normal path of flow of the liquid being dispensed and having an opening at its bottom, said opening and the discharge port of the tap being so disposed relative to each other that the discharging liquid is out of contact with the foam entering the receptacle, and a closure for said receptacle normally sealing said opening, said receptacle being adapted to be opened to discharge any foam and liquid contained therein as a vessel is brought to filling position and to receive the foam rising in the vessel as the liquid flows thereinto through the tap, and to be closed as the filled vessel is withdrawn so as to retain the foam trapped therein.

3. The combination with a tap for dispensing a foaming liquid and having a passage through which the liquid flows, of an appliance comprising a receptacle associated therewith outside of the normal path of flow of the liquid being dispensed and adapted for juxtaposition with a vessel receiving said foaming liquid from the tap to receive and temporarily store the foam rising in the vessel, said receptacle having an inclined wall for sealing engagement with the upper edge of the vessel to be filled, and valve mechanism normally closing the bottom of said receptacle and adapted to be opened as the vessel is moved into filling position to discharge the foam collected therein into the vessel and to enable the foam rising in the vessel to flow into said receptacle as the liquid flows through the tap and fills the vessel.

4. An appliance as set forth in claim 2, wherein said receptacle comprises a cup, the discharge end of the tap extending through the bottom of such cup, said discharge end having a flange to limit the downward movement of said cup and cooperating with the bottom rim of the cup to seal said aperture when said cup is in its lowermost position.

5. An appliance for dispensing foaming liquids, comprising a stem adapted to be secured to a tap for dispensing foaming liquid, and a receptacle having an apertured bottom and slidingly mounted upon and surrounding said stem, said stem being hollow to the bottom edge thereof and thus discharging vertically downwards, an annular flange on the stem adjacent to the bottom edge thereof to limit the sliding movement of said receptacle in the downward direction and acting as a seal for said receptacle in the lowermost position of the latter, said receptacle adapted to be lifted from said flange by a vessel to be filled to discharge into the latter any foam contained therein, to receive the foam rising in said vessel as it is filled, and to drop upon said flange to trap such foam when the said vessel is removed.

6. An appliance as set forth in claim 5, including an abutment on said stem, and a coil spring surrounding said stem and engaging said abutment and said receptacle to urge the latter into sealing engagement with said flange.

7. In an appliance for dispensing foaming liquids, the combination with a discharge member which discharges vertically downwards, of a cup member movably mounted upon and surrounding the discharge member, means for guiding the cup member upon the discharge member, and means on said discharge member providing a seat for said cup member and adapted to cooperate with the bottom of the latter to seal the same, said cup member being adapted to be engaged by a vessel to be filled in such manner that the cup member is raised to provide a lateral passage from the upper portion of the vessel into the interior of the cup member, whereby foam contained in the latter is discharged into the vessel and foam rising in said vessel during the filling enters the cup, said cup dropping upon said seating means and trapping the foam therein upon removal of the filled vessel.

8. The combination with a tap for dispensing a foaming liquid and having a passage through which the liquid flows, of apparatus for receiving and storing the foam rising during the filling of one vessel and discharging such foam and the liquid condensed therefrom into the next vessel to be filled, comprising a receptacle associated with the tap outside of the normal path of flow of the liquid being dispensed and having an opening at its bottom and a closure for said receptacle normally sealing said opening, said receptacle being adapted to be opened to discharge any foam and liquid contained therein as a vessel is brought to filling position and to receive the foam rising in the vessel as the liquid flows thereinto through the tap, and to be closed as the filled vessel is withdrawn so as to retain the foam trapped therein, said receptacle being formed as a cup surrounding the discharge end portion of the tap, and having its outer wall in position to be engaged by the rim of said vessel, said cup being movable vertically into open position by said vessel as the latter is raised to filling position.

9. An appliance for dispensing foaming liquids, comprising a hollow stem adapted to be secured to a tap for dispensing foaming liquid, a receptacle having an apertured bottom and slidingly mounted upon and surrounding said stem, said stem having a flange thereon to limit the sliding movement of said receptacle in the downward direction and acting as a seal for said receptacle in the lowermost position of the latter, said receptacle adapted to be lifted from said flange by a vessel to be filled to discharge into the latter any foam contained therein, to receive the foam rising in said vessel as it is filled, and to drop upon said flange to trap such foam when the said vessel is removed, and guiding members attached to said receptacle and engaging said stem for guiding the receptacle in its vertical movements on the stem.

10. The combination with a tap for dispensing a foaming liquid and having a passage through which the liquid flows, of apparatus for receiving and storing the foam rising during the filling of one vessel and discharging such foam and the liquid condensed therefrom into the next vessel to be filled, comprising a receptacle associated with the tap outside of the normal path of flow of the liquid being dispensed and having an opening at its bottom, and a closure for said receptacle normally sealing said opening, said receptacle being adapted to be opened to discharge any foam and liquid contained therein as a vessel is brought to filling position and to receive the foam rising in the vessel as the liquid flows thereinto through the tap, and to be closed as the filled vessel is withdrawn so as to retain the foam trapped therein, said receptacle comprising a cup of circular cross-section whose bottom portion is adapted to be received within the mouth of the vessel to be filled and whose upper portion is shaped for sealing engagement with the rim of said vessel.

11. The combination with a vertically discharging tap for dispensing a foaming liquid and having a passage through which the liquid flows, of apparatus for receiving and storing the foam rising during the filling of one vessel and discharging such foam and the liquid condensed therefrom into the next vessel to be filled, comprising a receptacle associated with the tap and having an opening at the bottom thereof presenting a free path, unopposed by a descending column of liquid when the tap is discharging, for the flow into such receptacle of foam rising in the vessel being filled, and a closure for said receptacle normally preventing access to the interior of said receptacle through said opening, said receptacle, upon opening of said closure, discharging any foam and liquid contained therein through said opening as a vessel is brought to filling position and receiving the foam rising in the vessel as the liquid flows thereinto through the tap.

12. The combination with a tap for dispensing a foaming liquid, of apparatus for receiving and storing the foam rising during the filling of one vessel and discharging such foam and the liquid condensed therefrom into the next vessel to be filled, comprising a receptacle associated with the tap and having an opening at its bottom, and a closure for said receptacle normally sealing said opening, the wall of said receptacle having a laterally extending portion for engagement with the upper edge of the vessel to be filled to form a seal therewith and being adapted to be opened to discharge any foam and liquid contained therein as a vessel is brought to filling position and to receive the foam rising in the vessel as the liquid flows thereinto through the tap, and to be closed as the filled vessel is withdrawn so as to retain the foam trapped therein.

13. In a dispensing mechanism for foaming liquids, the combination of a vertically discharging pipe, a cup-like receptacle slidably mounted on said pipe, an annular flange adjacent to the discharge end of said pipe and having a surface of relatively soft material adapted to form a seal, said receptacle having an opening at its bottom and normally engaging said flange which operates to close said opening, said cup being of circular cross-section and having inclined walls adapted to be sealingly engaged by a vessel to be filled to lift said cup off the flange, whereby as liquid is discharged vertically by said pipe the foam enters the cup laterally by way of the annular opening between the flange and the bottom edge of the raised cup, and means for guiding the cup upon the pipe.

14. The combination with a tap for dispensing a foaming liquid and having a passage through which the liquid flows, of apparatus for receiving and storing the foam rising during the filling of one vessel and discharging such foam and the liquid condensed therefrom into the next vessel to be filled, comprising a receptacle associated with the tap outside of the normal path of flow of the liquid being dispensed and having a single inlet and outlet opening at its bottom, and a single closure for said receptacle normally sealing said opening, said receptacle being adapted to be opened to discharge any foam and liquid contained therein as a vessel is brought to filling position and to receive the foam rising in the vessel as the liquid flows thereinto through the tap, and to be closed as the filled vessel is withdrawn so as to retain the foam trapped therein.

15. The combination with a tap for dispensing a foaming liquid and having a passage through which the liquid flows, of an appliance comprising a receptacle associated therewith outside of the normal path of flow of the liquid being dispensed and adapted for juxtaposition with a vessel receiving said foaming liquid from the tap to receive and temporarily store the foam rising in the vessel, said receptacle having a single aperture in its bottom and valve mechanism normally closing the bottom aperture of said receptacle and adapted to be opened as the vessel is moved into filling position to discharge the foam collected therein through said single aperture into the vessel and to enable the foam rising in the vessel to flow into said receptacle through the same aperture.

16. The combination with a tap for dispensing a foaming liquid and having a passage through which the liquid flows, of apparatus for receiving and storing the foam rising during the filling of one vessel and discharging such foam and the liquid condensed therefrom into the next vessel to be filled, comprising a receptacle associated with the tap and having an opening presenting a free path, unopposed by a descending column of liquid when the tap is discharging, for the flow into such receptacle of foam rising in the vessel being filled, and a closure for said receptacle normally sealing said opening, said opening in the receptacle being adapted to be opened to discharge any foam and liquid contained therein as a vessel is brought to filling position and to receive through the same opening the foam rising in the vessel as the liquid flows thereinto through the tap, and to be closed as the filled vessel is withdrawn so as to retain the foam trapped therein.

17. In a beverage dispenser, the combination with a faucet connected with a source of beverage supply, of a discharge tube connected therewith, said tube being open at the bottom edge and discharging vertically downwards, an expansion chamber movable thereon and adapted to receive excess foamy beverage, sealing means for retaining the foamy beverage in the chamber, and resilient means tending to move the chamber against its sealing means.

BALTHAZAR H. T. MULCH.